(12) United States Patent
Griffiths et al.

(10) Patent No.: US 9,091,832 B2
(45) Date of Patent: Jul. 28, 2015

(54) PRE-CONNECTORIZED OPTICAL FIBRE CABLE, AND KIT FOR THE DEPLOYMENT THEREOF

(75) Inventors: Ian James Griffiths, Milan (IT); Antonio Giglio, Milan (IT); Luca Cavenaghi, Milan (IT)

(73) Assignee: PRYSMIAN S.P.A., Milan (IT)

( * ) Notice: Subject to any disclaimer, the term of this patent is extended or adjusted under 35 U.S.C. 154(b) by 714 days.

(21) Appl. No.: 13/376,772

(22) PCT Filed: Jun. 8, 2009

(86) PCT No.: PCT/EP2009/057024
§ 371 (c)(1), (2), (4) Date: Feb. 16, 2012

(87) PCT Pub. No.: WO2010/142316
PCT Pub. Date: Dec. 16, 2010

(65) Prior Publication Data
US 2012/0141075 A1 Jun. 7, 2012

(51) Int. Cl.
*G02B 6/00* (2006.01)
*G02B 6/44* (2006.01)
*H02G 1/08* (2006.01)

(52) U.S. Cl.
CPC .............. *G02B 6/4465* (2013.01); *H02G 1/081* (2013.01)

(58) Field of Classification Search
None
See application file for complete search history.

(56) References Cited

U.S. PATENT DOCUMENTS

| | | | |
|---|---|---|---|
| 5,836,061 A * | 11/1998 | Castillo et al. | 24/702 |
| 6,899,467 B2 | 5/2005 | McDonald et al. | |
| 7,244,066 B2 | 7/2007 | Theuerkorn | |
| 2003/0063867 A1 | 4/2003 | McDonald et al. | |
| 2004/0047566 A1 | 3/2004 | McDonald et al. | |
| 2006/0035751 A1 | 2/2006 | Blair et al. | |
| 2006/0193562 A1 * | 8/2006 | Theuerkorn | 385/53 |
| 2006/0193592 A1 | 8/2006 | McNie et al. | |
| 2009/0057010 A1 | 3/2009 | Scherer et al. | |

OTHER PUBLICATIONS

International Search Report from the European Patent Office for International Application No. PCT/EP2009/057024, mailing date Feb. 26, 2010.
European Office Action dated Feb. 6, 2015 under European Patent Application No. 09 779 669.2-1504, corresponding to PCT Application No. PCT/EP2009-057024, filed Jun. 8, 2009.

* cited by examiner

*Primary Examiner* — Uyen Chau N Le
*Assistant Examiner* — Hoang Tran
(74) *Attorney, Agent, or Firm* — Finnegan, Henderson, Farabow, Garrett & Dunner, L.L.P.

(57) ABSTRACT

An optical fiber cable, includes at least one optical fiber and a cable connector at a cable end, and a removable cap removably couplable to a free end of the cable connector. The cap includes a recess adapted to receive and accommodate an anchor element of a cable pulling rope, and to retain the anchor element against traction when the pulling rope is tractioned.

10 Claims, 3 Drawing Sheets

PRE-CONNECTORIZED OPTICAL FIBRE CABLE, AND KIT FOR THE DEPLOYMENT THEREOF

CROSS REFERENCE TO RELATED APPLICATION

This application is a national phase application based on PCT/EP2009/057024, filed Jun. 8, 2009, the content of which is incorporated herein by reference.

BACKGROUND OF THE INVENTION

1. Field of the Invention

The present invention generally relates to optical communication networks, and more particularly to optical fiber cables used in optical communication networks. More specifically, the invention relates to a pre-connectorized optical fiber cable and to a kit for the deployment of optical fiber cables.

2. Description of the Related Art

In the field of optical communication networks, the expression "Fiber-to-the-x" ("FTTx") is used to denote a network architecture making use of optical fibers for at least partially replacing the conventional copper wire for the last-mile loop. In particular, the expression "Fiber-to-the-Premises" ("FTTP") denotes the portion of the optical communication network that reaches the premises (home, offices and the like) of the end user.

In FTTx networks, pre-connectorized optical fiber cables can be used for the deployment.

Generally, a connector is a mechanical component used to align and join together two or more optical fibres, thereby providing a means for attaching to, and decoupling from, a fibre optic device, e.g. a joint closure. A connector generally comprises a ferrule and a connector body. The ferrule is a relatively long and thin cylinder bored through the centre thereof so as to receive the optical fibre, and acting as a fibre alignment mechanism, whereinto the optical fibre is inserted in such a way that the end of the optical fibre is located in correspondence of the ferrule end portion. The connector body is a substantially cylindrical holding element which is suitable for receiving the ferrule.

In the deployment of optical fiber cables, especially for cabling a building, difficulties are commonly encountered. The buildings' in-wall conduits that are exploited for deploying the optical fiber cables often already contain other cables, both for power and telecommunication transmission purposes (e.g., electric power cables, telephone cables etc.). This complicates the operation of dragging the optical fiber cable through the conduits, mainly due to lack of space left.

In order to facilitate the optical fiber cable dragging through the in-wall conduits, the cable encumbrance should be as small as possible. In a pre-connectorized optical fiber cable, the greatest encumbrance is given by the connector and the cable pulling grip provided for securing to the cable a pulling rope used for dragging the cable through the in-wall conduit to the end-user premises.

U.S. Pat. No. 6,899,467 discloses a relatively small fiber optic plug provided to facilitate pulling of the fiber optic plug and an associated fiber optic cable through small passageways. The fiber optic plug includes a shroud that protects the fiber optic connector and that may further define at least one opening, and preferably a pair of openings. The openings are sized to receive portions of an adapter sleeve once the fiber optic plug is mated with a fiber optic receptacle. The fiber optic plug also includes a cap mounted upon and adapted to swivel relative to the remainder of the fiber optic plug to serve as a pulling grip during installation of the fiber optic cable. To this purpose, the cap has an opening for the connection of a rope, cable or the like to pull the fiber optic cable.

U.S. Pat. No. 7,244,066 discloses a fiber optic receptacle and plug assembly including a fiber optic receptacle adapted to be mounted within a connector port of a network connection terminal and a fiber optic plug mounted upon an end of a fiber optic cable, wherein the fiber optic receptacle and the fiber optic plug comprise complimentary alignment and keying features that allow the fiber optic receptacle to receive only a fiber optic plug of like ferrule configuration. The fiber optic receptacle includes an alignment sleeve insert operable for receiving and optically connecting at least one receptacle ferrule and at least one opposing plug ferrule. A protective pulling cap is provided, that is secured to the plug assembly during shipment and deployment; the pulling cap may be secured to a drop cable using a tether.

SUMMARY OF THE INVENTION

The Applicant observes that the form of the pulling grip for attaching the pulling rope and the way the latter is secured to the cable are critical because they increase the cable hindrance. For example, in those solutions that provide for attaching the end of the pulling rope by making a knot, the encumbrance of the knot is substantial.

On the other side the connection between pulling rope and optical cable has to be strong enough to stand the pulling force exerted for dragging the cable, for example in an in-wall conduit, to the end user's premises.

The Applicant has found that a solution to the problem may consist in providing a pre-connectorized optical cable, wherein the connector comprises, at the terminus thereof, a removable cap having both protective and pulling functions. In particular, the cap can be joined to the body of the connector by screwing, and provide protection to the optical fiber end(s). The cap has a design such that:

the dimensions thereof are minimized, more specifically the outer diameter of the cap is substantially the same of the connector body; and the cap is suitable for establishing a connection with the pulling rope, said connection being capable not exceeding the cap diameter and being resistant to the pulling force applied for deploying the cable connected thereto.

In particular, the cap is provided with a recess for receiving and accommodating a terminus of the pulling rope provided with an anchor element that, in use, engages the recess and is retained therein against traction forces.

According to an aspect the present invention relates to an optical fiber cable, comprising at least one optical fiber and a connector at a cable end, and a removable cap having a recess.

Said recess may comprise a first recess portion and a second recess portion in longitudinal succession; the second recess portion extends from a free end of the cap and is open at said free end; the first recess portion is wider than the second recess portion so as to define an abutment for an enlarged portion of the anchor element.

Advantageously, the cap comprises a threaded portion at an end opposite to said free end, and adapted to be screwed to the connector. Alternatively, the cap may comprise, at an end opposite to said free end, at least one pin or slot matching at least one slot or pin of the connector. In the latter case, the connector is advantageously provided with a spring that maintains a clamping force between the cap pin or slot and the connector slot or pin.

The cap may comprise a cavity for receiving and accommodating an end of a ferrule protruding from the connector.

The cap of the cable of the present invention is suitable both for protecting the at least one optical fiber contained in the cable against dust or damage, and for allowing the dragging of the cable up to or in the vicinity of the end user's premise.

According to another aspect, the present invention relates to a kit for deploying an optical fiber cable, the kit comprising:
- a pulling rope comprising a rope and an anchor element connected to at least one end of the rope;
- an optical fiber cable, comprising at least one optical fiber and a connector at a cable end, and a removable cap having a recess adapted for receiving and retaining the anchor element.

The anchor element may comprise a nipple at an end, said nipple being adapted to be received and accommodated within the recess of the cap. By the nipple, the recess can retain the anchor element against traction when the pulling rope is tractioned.

The anchor element, the connector and connector cap of the kit of the invention can be made of metal, for example steel or optionally plated brass.

The pulling rope of the kit of the invention can comprise threads made of steel or of a polymeric material such as aromatic polyamide.

The connector cap according to the invention has small dimensions, the diameter thereof being preferably lower than 4.5 mm, more preferably of about 4 mm or less. The cap diameter does not exceed the connector diameter that, in turn, can depend on the number of optical fibers contained therein.

Because of the shape and the kind of joint established with the cable cap, the anchor element of the kit according to the invention provide a pulling grip having the same, minimized dimensions of the cable connector.

When coupled, the anchor element of the pulling rope and the connector of the optical cable of the kit of the invention are capable of bearing the pulling force requested for the cable deployment, for example of 20-35 kg.

The coupling between anchor element and connector cap is attained very easily, with no need of threading or knots.

BRIEF DESCRIPTION OF THE DRAWINGS

These and other features of the present invention will be made apparent by the following detailed description of an exemplary and non-limitative embodiment thereof; for better intelligibility, the description should be read in conjunction with the attached drawings, wherein.

DETAILED DESCRIPTION OF AN EMBODIMENT OF THE INVENTION

Figure 1:
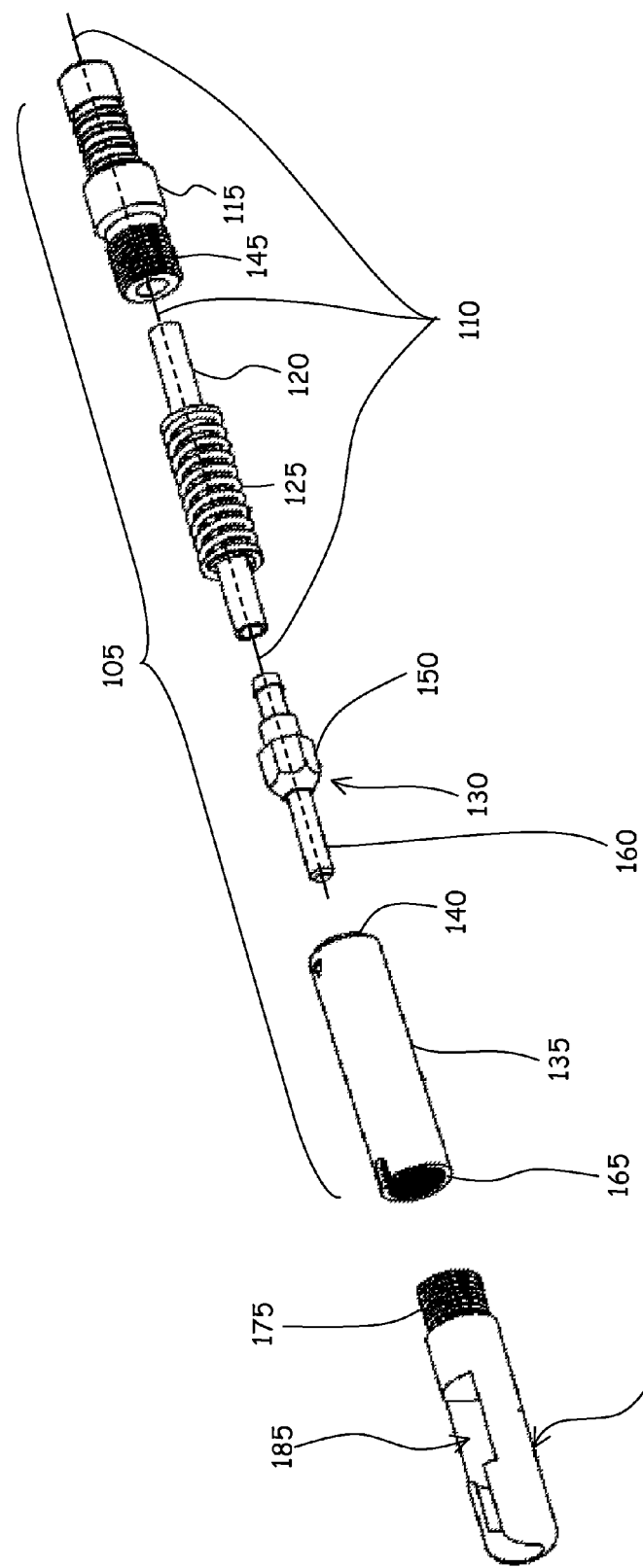
FIG. 1 shows, in axonometric and exploded view, a pre-connectorized optical fiber cable according to an embodiment of the present invention.

With reference to the drawings, in FIG. 1 there is shown, in perspective and exploded view, a pre-connectorized optical fiber cable according to an embodiment of the present invention.

The optical fiber cable comprises, at an end thereof, a connector, globally denoted 105; the connector 105 is used to align and join together two or more optical fibres, thereby providing a means for attaching to, and decoupling from, at least one optical fiber 110 of the cable a fibre optic device, e.g. a joint closure (not shown in the drawings).

Figure 2:
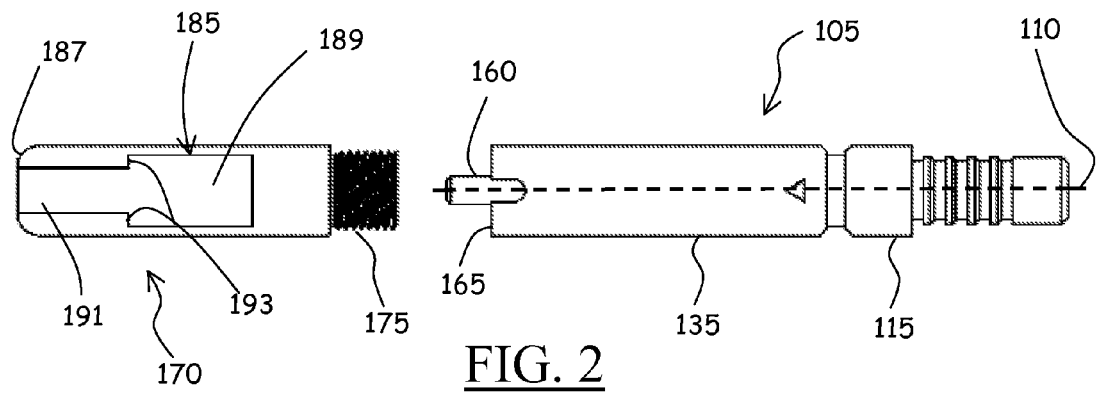
FIG. 2 shows in top view the connector of the cable of FIG. 1 with the connector cap removed.
Figure 3:
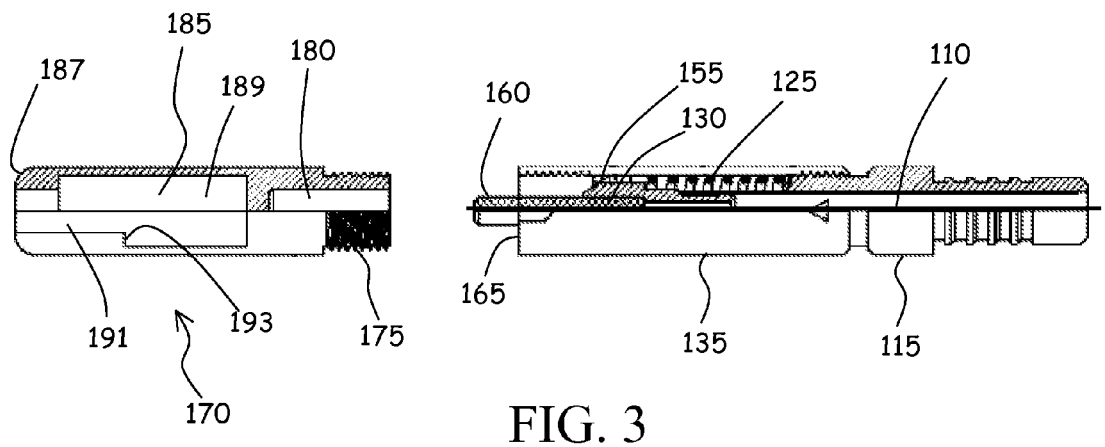
FIG. 3 is similar to FIG. 2, but in partial cross-section.

Referring also to FIGS. 2 and 3, the connector 105 comprises, arranged in longitudinal succession, a retainer body 115, a tubular member 120 inserted through a bias helical spring 125, a ferrule 130 and a hollow outer housing 135. The assembling of the connector 105 provides for accommodating the tubular member 120 partly inside the retainer body 115 and partly inside the outer housing 135, while abutting one end of the ferrule 130, which is accommodated within the outer housing 135. Then the outer housing 135 is closed at one end 140 thereof by the retainer body 115, which has a terminal threaded portion 145 adapted to be screwed into a matching thread provided inside the outer housing at said end 140. The bias spring 125 results compressed between the rim of the retainer body 115 and an intermediate flange 150 of the ferrule 130, thereby biasing the ferrule against a shoulder 155 provided inside the outer housing 135. The ferrule 130 has a tubular end portion 160 that slightly protrudes from a second end 165 of the outer housing 135. The optical fiber 110 from the cable passes through the retainer body 115, the tubular member 120 and the ferrule 130, and slightly protrudes from the open end of the ferrule tubular end portion 160.

A protection/pulling cap 170 is removably mounted frontally to the outer housing 135, for example by screwing. The cap 170, when mounted to the connector 105, protects the end of the optical fiber 110 protruding from the ferrule 130.

The cap 170 is a substantially cylindrical body having, at a first end 175 thereof, a male thread portion for screwing it into the outer housing 135. A cavity 180 is also provided at the first end 175 of the cap 170, for accommodating the end portion 160 of the ferrule 130 that protrudes from the connector 105. The cap 170 has a recess formed therein, in the form of a slot 185 extending along the cap 170 to the second end 187 thereof. The slot 185 comprises a first portion 189 and a second portion 191, longitudinally aligned one another; the first portion 189 is, transversally to the cap main axis, wider than the second portion 191, thereby a shoulder 193 is formed at the transition from the first to the second slot portions 189 and 191. The slot 185 is open at the end 189 of the cap 170.

In alternative to a screw-type coupling of the cap to the connector, other types of couplings may be used, for example a pin or a slot provided on the cap and adapted to engage/be engaged by a corresponding slot or pin provided on the connector, possibly using bias springs to ensure the engagement of the pin into the respective slot.

Figure 4:
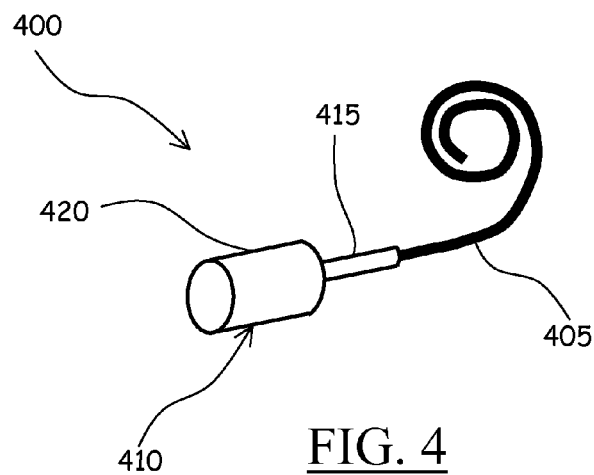
FIG. 4 schematically shows a pulling rope according to an embodiment of the present invention.

In FIG. 4 there is shown a pulling rope 400 according to an embodiment of the present invention, intended to be used for dragging the pre-connectorized optical cable through, for example, in-wall conduits provided in the walls of a building, for deploying the optical fiber cable.

The pulling rope 400 comprises a rope 405, for example in stranded metal wires, e.g. stainless steel, or of a polymeric material such as aromatic polyamide; an end of the rope 405 is gripped by an end anchor element 410. The anchor element 410 comprises a collar 415 secured to the end of the rope 405, and a nipple 420. The nipple 420 has shape and size adapted to be received within the first portion 189 of the slot 185; adversely, the nipple 420 is wider than the slot second portion 191, thereby the nipple 420 can abut the shoulder 193 that acts as a stop element for the nipple 420 and thus for the pulling rope 400 when the pulling rope 400 is subjected to traction.

The anchor element 410, and the connector 105 and connector cap 170 can be made of metal, for example steel or optionally plated brass.

Figure 5:
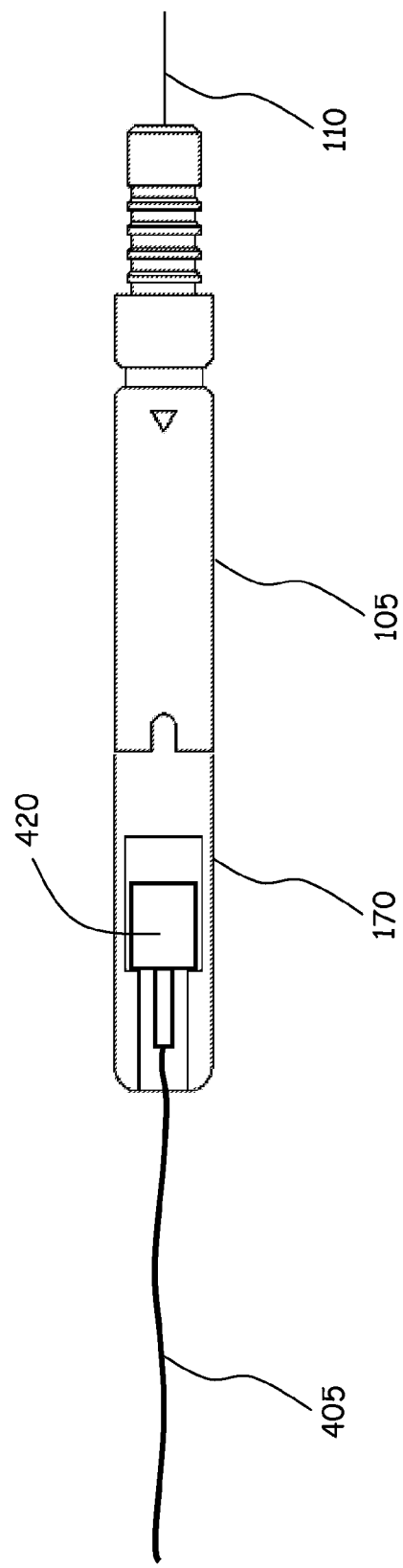
FIG. 5 shows, in a view similar to that of FIG. 2, the pulling rope anchored to the connector cap.

In use, as from FIG. 5, when the optical fiber cable has to be deployed, for example drawn through an in-wall conduit of a building to reach the subscriber premises, the anchor element 410 of the pulling rope 400 is secured to the cap 170, by inserting the nipple 420 into the slot 185. When drawing the pulling rope 400, the nipple 420 abuts against the shoulder 193 in the cap 170, so that the traction force is transmitted to the optical fiber cable, which is thus drawn through the in-wall conduit.

As can be noted from FIG. 5 the cap 170 has substantially the same outer diameter of the connector body 105.

The solution according to the described invention embodiment achieves very reduced encumbrance; the dimension of the connector 105 can be as small as 4 mm, and the attachment of the pulling rope 400 for deploying the cable does not increase the overall size, thanks to the peculiar connection arrangement: the anchor element 410 is fully accommodated within the slot 185 formed in the cap 170. Also, the pulling rope connection arrangement is able to sustain significant traction forces, for example of 20-35 kg, which are experienced when the cable is dragged through in-wall conduits.

The invention claimed is:

1. An optical fiber cable, comprising at least one optical fiber, a cable connector at a cable end, and removable cap removably coupleable to a free end of the cable connector, wherein the cap comprises a recess adapted to receive and accommodate an anchor element of a cable pulling rope, and to retain the anchor element against traction when the pulling rope is tractioned wherein the recess comprises a slot extending longitudinally along the outer surface of the cap, the slot having an opening at the free end of the cap.

2. The cable of claim 1, wherein said recess comprises a first recess portion and a second recess portion in longitudinal succession, the second recess portion extending from a free end of the cap and being open at said free end, the first recess portion being wider than the second recess portion so as to define an abutment for an enlarged portion of the anchor element.

3. The cable of claim 1, wherein the cap comprises a threaded portion at an end opposite said free end, and adapted to be screwed to the connector.

4. The cable of claim 1, wherein the cap comprises, at an end opposite said free end, at least one pin or slot matching at least one slot or pin of the connector.

5. The cable of claim 4, wherein the connector or the cap is provided with a bias spring adapted to maintain a clamping force between the cap pin or slot and the connector slot or pin.

6. The cable of claim 1, wherein the cap comprises a cavity for receiving and accommodating an end of a ferrule protruding from the connector.

7. The cable of claim 1, wherein the connector and the connector cap are metal, steel or plated brass.

8. A kit for deploying an optical fiber cable comprising: a pulling rope comprising a rope and an anchor element connected to at least one end of the rope; and an optical fiber cable, comprising at least one optical fiber, a cable connect at a cable end, and removable cap removably coupled to a free end of the cable connector, the cap comprising a recess adapted to receive and accommodate said anchor element, and to retain the anchor element against traction when the pulling rope is tractioned wherein the recess comprises a slot extending longitudinally along the outer surface of the cap, the slot having an opening at the free end of the cap.

9. The kit of claim 8, wherein the anchor element comprises a nipple at an end, said nipple being adapted to be received and accommodated within the recess of the cap and to be retained against traction when the pulling rope is tractioned.

10. The kit of claim 8, wherein the anchor element, the connector and the connector cap are metal, steel or plated brass.

* * * * *